US012643269B2

(12) United States Patent

Fischer et al.

(10) Patent No.: US 12,643,269 B2

(45) Date of Patent: Jun. 2, 2026

(54) COMPOSITE ARTICLE COMPRISING A STRUCTURED POROUS BODY AND A FOAM AND A PROCESS THE PRODUCTION OF A STRUCTURED POROUS BODY AND A PARTICLE FOAM

(71) Applicant: Stratasys, Inc., Minnetonka, MN (US)

(72) Inventors: Florian Fischer, Ludwigshafen am Rhein (DE); Leander Verbelen, Heidelberg (DE); Erika Fantino, Heidelberg (DE); Lisa Marie Schmidt, Lemfoerde (DE); Eva Anna Haase, Lemfoerde (DE)

(73) Assignee: Stratasys, Inc., Minnetonka, MN (US)

( * ) Notice: Subject to any disclaimer, the term of this patent is extended or adjusted under 35 U.S.C. 154(b) by 179 days.

(21) Appl. No.: 18/037,095

(22) PCT Filed: Nov. 12, 2021

(86) PCT No.: PCT/EP2021/081565

§ 371 (c)(1),
(2) Date: May 16, 2023

(87) PCT Pub. No.: WO2022/106319

PCT Pub. Date: May 27, 2022

(65) Prior Publication Data

US 2023/0339152 A1      Oct. 26, 2023

(30) Foreign Application Priority Data

Nov. 17, 2020      (EP) .................................... 20208235

(51) Int. Cl.
B29C 44/12          (2006.01)
B29C 44/44          (2006.01)
(Continued)

(52) U.S. Cl.
CPC ........ B29C 44/1285 (2013.01); B29C 44/445 (2013.01); B32B 5/18 (2013.01); (Continued)

(58) Field of Classification Search
CPC ......... B33Y 80/00; B33Y 10/00; A45C 13/30; A45F 2003/125; A45F 3/12; (Continued)

(56) References Cited

U.S. PATENT DOCUMENTS 4,863,538 A      9/1989  Deckard
5,647,931 A      7/1997  Retallick et al.
(Continued)

FOREIGN PATENT DOCUMENTS

AT          521642 A2      3/2020
CH          706241 A2      9/2013
(Continued)

OTHER PUBLICATIONS

International Preliminary Report on Patentability received for PCT Patent Application No. PCT/EP2021/081565, mailed on Sep. 19, 2022, 6 pages.

(Continued)

*Primary Examiner* — Stella K Yi
(74) *Attorney, Agent, or Firm* — Faegre Drinker Biddle & Reath LLP

(57) ABSTRACT

The present invention relates to a process for the production of a composite article comprising a structured porous body (PB) and a particle foam (PF), wherein the provided structured porous body (PB) is inserted into a mould (M) and the mould (M) is filled with expanded foam beads (EFB) so that the expanded foam beads (EFB) are in contact with each other and the structured porous body (PB) is at least partially in contact with the expanded foam beads (EFB). Then, the expanded foam beads (EFB) are thermally welded, wherein (Continued)

the particle foam (PF) is built and the composite article is obtained. Moreover, the present invention relates to a composite article obtained by this process, as well as to a composite article comprising a structured porous body (PB) and a particle foam (PF). The present invention further relates to the use of the inventive composite articles in the shoe industry, in the sports and leisure sector, in vehicle construction, in the medical sector, in mechanical engineering and in the logistics sector. Furthermore, the present invention relates to a composite article comprising a structured porous body (PB) and a foam (F), wherein the structured porous body (PB) and the foam (F) comprise the same polymer (P).

11 Claims, 2 Drawing Sheets

(51) Int. Cl.

| | |
|---|---|
| *B29K 105/00* | (2006.01) |
| *B29K 105/04* | (2006.01) |
| *B32B 5/18* | (2006.01) |
| *B32B 5/32* | (2006.01) |

(52) U.S. Cl.
CPC ............ *B32B 5/32* (2013.01); *B29K 2105/04* (2013.01); *B29K 2105/251* (2013.01)

(58) Field of Classification Search
CPC ............ B29C 44/1285; B29C 44/3426; B29C 44/445; B29C 64/153; B29C 67/205; B29C 44/1209; B29C 44/005; B29C 44/1238; B29C 44/1233; B29C 44/1228; B29C 44/1223; B29C 44/1219; B29C 44/1204; B29C 44/12; B29C 44/187; B29C 44/18; B29C 44/16; B29C 44/148; B29K 2105/04; B29K 2105/251; B32B 5/18; B32B 5/32
See application file for complete search history.

(56) References Cited

U.S. PATENT DOCUMENTS

| | | | |
|---|---|---|---|
| 5,658,412 A | 8/1997 | Retallick et al. | |
| 2004/0224139 A1* | 11/2004 | Backhouse | B29C 70/446 |
| | | | 428/292.1 |
| 2015/0150381 A1 | 6/2015 | Lee | |
| 2016/0145961 A1 | 5/2016 | Yu et al. | |
| 2016/0324260 A1 | 11/2016 | Guyan | |
| 2018/0071979 A1 | 3/2018 | Achten et al. | |
| 2018/0271211 A1 | 9/2018 | Perrault et al. | |
| 2019/0161591 A1 | 5/2019 | Farris et al. | |
| 2019/0223618 A1 | 7/2019 | Achten et al. | |
| 2019/0357695 A1 | 11/2019 | Achten et al. | |
| 2020/0384672 A1 | 12/2020 | Brexeler et al. | |
| 2021/0177093 A1 | 6/2021 | Perrault et al. | |

FOREIGN PATENT DOCUMENTS

| | | | |
|---|---|---|---|
| CN | 106998847 A | | 8/2017 |
| CN | 108652126 A | | 10/2018 |
| CN | 109562540 A | | 4/2019 |
| CN | 109688877 A | | 4/2019 |
| DE | 4008173 | * | 9/1991 |
| DE | 3400909 | * | 3/2018 |
| EP | 3292795 A1 | | 3/2018 |
| FR | 2779088 A1 | | 12/1999 |
| FR | 2812234 A1 | | 2/2002 |
| FR | 2919238 A1 | | 1/2009 |
| WO | 94/20568 A1 | | 9/1994 |
| WO | 2007/082838 A1 | | 7/2007 |
| WO | 2010/010010 A1 | | 1/2010 |
| WO | 2013/153190 A1 | | 10/2013 |
| WO | 2015/108543 A1 | | 7/2015 |
| WO | 2017/030835 A1 | | 2/2017 |
| WO | 2017/109079 A1 | | 6/2017 |
| WO | 2019/198642 A1 | | 10/2019 |

OTHER PUBLICATIONS

International Search Report and Written Opinion received for PCT Patent Application No. PCT/EP2021/081565, mailed on Feb. 3, 2022, 11 pages.

* cited by examiner

COMPOSITE ARTICLE COMPRISING A STRUCTURED POROUS BODY AND A FOAM AND A PROCESS THE PRODUCTION OF A STRUCTURED POROUS BODY AND A PARTICLE FOAM

CROSS-REFERENCE TO RELATED APPLICATIONS

This application is a National stage application (under 35 U.S.C. § 371) of PCT/EP2021/081565, filed Nov. 12, 2021, which claims benefit of European Application No. 20208235.0, filed Nov. 17, 2020, both of which are incorporated herein by reference in their entirety.

Figure 1:
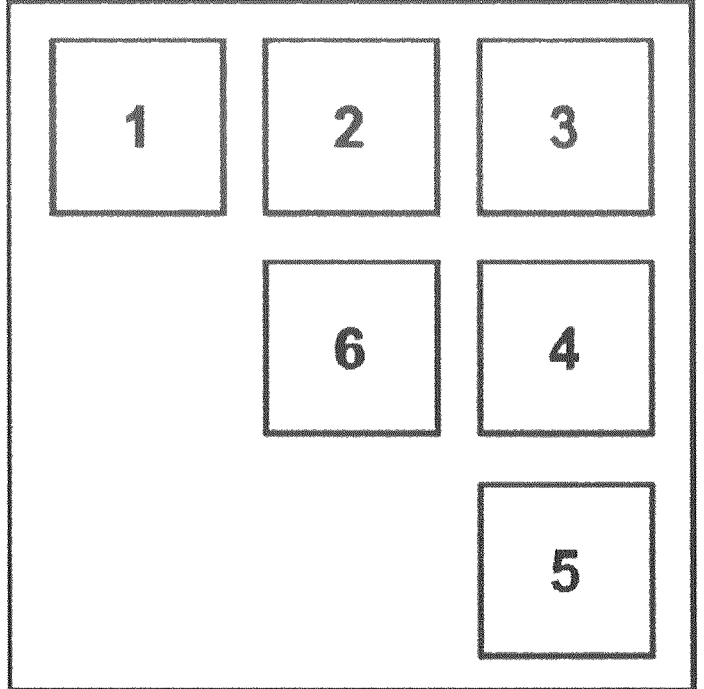
FIG. 1 is a schematic of the positions of where several specimens were cut out of a composite article.

The present invention relates to a process for the production of a composite article comprising a structured porous body (PB) and a particle foam (PF), wherein the provided structured porous body (PB) is inserted into a mould (M) and the mould (M) is filled with expanded foam beads (EFB) so that the expanded foam beads (EFB) are in contact with each other and the structured porous body (PB) is at least partially in contact with the expanded foam beads (EFB). Then, the expanded foam beads (EFB) are thermally welded, wherein the particle foam (PF) is built and the composite article is obtained. Moreover, the present invention relates to a composite article obtained by this process, as well as to a composite article comprising a structured porous body (PB) and a particle foam (PF). The present invention further relates to the use of the inventive composite articles in the shoe industry, in the sports and leisure sector, in vehicle construction, in the medical sector, in mechanical engineering and in the logistics sector. Furthermore, the present invention relates to a composite article comprising a structured porous body (PB) and a foam (F), wherein the structured porous body (PB) and the foam (F) comprise the same polymer (P).

By using pure foams, it is possible to achieve a wide range of properties in hardness, flexibility and rebound which are defined by the density and size distribution of the spherical air cells enclosed in the foam, as well as by the foam material itself. In principle, it is also possible to achieve different densities within one single foam part; however, this is very difficult when using particle foams produced by thermal welding, as, with the usual methods, it is not possible to place the different particles or beads exactly into a mould.

Structured porous bodies like, for example, triply periodic minimal surfaces (TPMS) or lattices generally comprise a three-dimensional network of node points, connected to one another by struts, and a void volume present between the struts. In case the porous bodies are periodically structured, they commonly comprise a unit cell that repeats in at least two dimensions. To produce these structured porous bodies in a very cost-efficient, individualized and resource-conserving manner, a 3D-printing technology is often used. Similar to foams the properties can be controlled by the density of the structured porous bodies. In addition, the mechanical properties can be controlled by the unit cell type, size and/or the beam diameter of the 3D-printer. Compared to foams, not only spherical cavities are possible but all kind of structures. This allows designing a broader range of mechanical behaviour. Furthermore, it is also possible to vary the mechanical behaviour within a part of the structured porous body, so that different areas of this part have a different mechanical response. Therefore, the design of a structured porous body can be optimized for each specific end-user without extra production costs.

However, a disadvantage of structured porous bodies is a buckling under a certain pressure which means that, at a certain pressure, some of the struts of the structured porous bodies buckle and the resistance against compression rapidly drops. Further, as structured porous bodies are open structures, they can easily take up dirt and water if not sealed. Because of the large surface area of the structured porous bodies, they are also more quickly affected by environmental conditions like moisture and UV radiation. In addition, they often need expensive post-processing to clean them from residue powder and to smoothen the surface, especially when they are produced by a powder- or filament-based technology. Another disadvantage is that, due to the high complexity of 3D-printed (periodically) structured porous bodies, it is difficult to obtain a high part-to-part consistency, as small variations in the printing process can have a significant effect on the final part behavior.

In order to make optimum use of the advantages of both materials, and, to eliminate the disadvantages as far as possible, the separate optimisation of these two materials in terms of their composition and production processes as well as their combination in a composite material has recently gained a lot of interest.

EP 3 292 795 A1 describes the use of an elastic polymer for the production of a porous body in an additive manufacturing process. The polymer is selected, for example, from thermoset polyurethane elastomers (PUR) or thermoplastic urethane-based elastomers (TPU). The porous body can target a 40% compression of 10 to 100 kPa.

CN 109688877 A also describes a porous body produced in an additive manufacturing method. The material of the body is in a first region of the body different from the material in a second region of the body. The materials are, for example, selected from thermoplastic elastomers (TPE), thermoplastic polyurethane (TPU) or polyacrylate. The porous body also has a compression hardness (40% compression) in at least one spatial direction of ≥10 to ≤100 kPa.

US 2019/0357695 A1 describes a composite article comprising a body and solid foam, wherein the material of the body is different from that of the foam. The body is produced by means of an additive manufacturing process and is at least partially formed from a polymeric material selected from the group of, for example, thermosetting polyurethanes, epoxides or urethane-based thermoplastic elastomers (TPU). The composite article is produced by contacting the body with a reaction mixture which reacts to afford polymer foam, wherein the reaction mixture at least partially penetrates into the interior of the body. The reaction mixture may contain polyisocyanates, polyols and additionally chemical and/or physical blowing agents. The composite article features good weathering stability.

The article "The formation and stabilization of lattice structures via foam addition" (J. B. Ostos et al., Acta Materialia, 2012) presents a composite comprising a low-density polymer lattice structure with centimetre-scale voids and a stochastic foam with pores in the sub-millimetre scale in the spaces between the lattice struts. The lattice is made of photo-cured thiol-ene and coated with polyurethane pre-polymers in a high-speed mixer to obtain the composite.

US 2016/0324260 A1 describes an article of footwear with a midsole, wherein the midsole includes a lattice structure with a plurality of laths. The lattice structure is provided by a fused nylon or PTFE powder.

However, up to now especially the production of a composite material has been extremely problematic as the formation of the foam within the structured porous body can lead to several problems: For example, the exothermic formation of the foam can lead to high temperatures that destroy or deteriorate the structured porous body. Also, the strong and quick expansion of the foam can break some of the connections or struts of the structured porous body. Furthermore, the formation of the foam can also be influenced by the structured porous body, when the structured porous body, for example, acts as a nucleation site and leads to unexpected or uncontrollable foam structures. Finally, most examples in the state-of-the-art use different material chemistries for the structured porous body and the foam, which can lead to compatibility issues and also makes recycling much more difficult.

The object underlying the present invention was, therefore, to provide an improved process for producing a composite article comprising a structured porous body and a foam, which also allows independently tuning the mechanical properties of the structured porous body and the foam comprised in the composite article. With this process it should also be possible to improve opposite mechanical properties of the structured porous body and the foam independently. A further object of the present invention was to provide a composite material having good recycling properties.

According to a first aspect of the present invention, the object is achieved by a process for the production of a composite article comprising a structured porous body (PB) and a particle foam (PF), wherein the process comprises the following steps a) to d)

a) providing the structured porous body (PB), b) inserting the structured porous body (PB) provided in step a) into a mould (M), c) filling the mould (M) with expanded foam beads (EFB) so that the expanded foam beads (EFB) are in contact with each other and the structured porous body (PB) is at least partially in contact with the expanded foam beads (EFB), and d) thermally welding the expanded foam beads (EFB), wherein the particle foam (PF) is built and the composite article is obtained.

According to a second aspect of the present invention, the object is achieved by composite article comprising a structured porous body (PB) and a foam (F), wherein the structured porous body (PB) and the foam (F) each comprise the same polymer (P).

It has surprisingly been found that by the inventive process, especially by inserting the structured porous body (PB) into the mould (M), it is possible to define the mechanical properties of the composite article at any point of the composite article.

Further, it has surprisingly been found that the stiffness and compression hardness of the composite article could be increased compared to the stiffness of pure particle foam (PF) at lower density without influencing the rebound significantly. Due to the use of structured porous bodies (PB), it is also possible to achieve a stiffness gradient.

Surprisingly the composite article behaves stiffer in static and dynamic testing as a particle foam (PF) without structured porous body (PB) although the structured porous body (PB) is softer than the particle foam (PF).

Advantageously, the structured porous body (PB) does not show any negative influence on the thermally welding of the expanded foam beads (EFB) and the rebound.

Furthermore, in case a structured porous body (PB) and a foam (F) each comprise the same polymer (P), an improved compatibility and recyclability are achieved.

Definitions providing greater detail of the composite article and also of the inventive production process for said composite article are provided below.

Composite Article

Composite articles per se are in principle known to the person skilled in the art. They are usually composed of different solid-state components (materials) which normally differ from each other in their chemical nature and/or have special physical-mechanical properties due to their geometry. The "composite article" in the context of the present invention is preferably composed of a structured porous body (PB) and a particle foam (PF), wherein the particle foam (PF) is prepared by thermally welding expanded foam beads (EFB). The composite article in general is produced by a process comprising the steps a) to d).

Step a)

In step a), the structured porous body (PB) is provided.

The structured porous body (PB) preferably comprises at least one thermoplastic or thermoset polymer (TP) selected from the group consisting of impact modified vinyl-aromatic copolymers, thermoplastic styrene-based elastomers (S-TPE), polyolefins (PO), aliphatic-aromatic copolyesters, polycarbonates, thermoplastic polyurethanes (TPU), polyamides (PA), polyphenylene sulphides (PPS), polyaryletherketones (PAEK), polysulfones and polyimides (PI), more preferably of thermoplastic styrene-based elastomers (S-TPE), thermoplastic polyurethanes (TPU) and polyamides, and particularly preferably of thermoplastic polyurethanes (TPU).

The structured porous body (PB) comprises preferably a three-dimensional network of node points and a void volume, wherein the node points are joined to another by struts and the void volume is present between the struts.

The structured porous body (PB) can be periodically structured. In case the structured porous body (PB) is periodically structured, it comprises many identical unit cells and is defined by the design of a single unit cell which repeats itself in at least two dimensions.

Examples for suitable structured porous bodies (PB) are lattices or triply periodic minimal surfaces (TPMS).

In the context of the present invention, a "lattice" comprises a three-dimensional network of node points joined to one another by struts, and a void volume present between the struts, wherein one node point of the lattice can be connected with the same and/or a different quantity of struts as another node point of the lattice, and wherein the length of one strut of the lattice can be equal and/or different than another strut of the lattice. Therefore, in analogy to the terminology of crystallography, a lattice according to the invention can comprise a unit cell that repeats periodically in two or three dimensions and/or an amorphous structure.

As used herein, the term "triply periodic minimal surface" means that the minimal surface is comprised of a unit cell that repeats in three dimensions and has one of the two-hundred thirty crystallographic space groups as its symmetry group.

In a preferred embodiment, the structured porous body (PB) is a lattice.

The structured porous body (PB) is preferably produced by a three-dimensional (3D) printing process.

3D (three-dimensional) printing processes as such are known to a person skilled in the art. In principle, all known different 3D printing techniques, such as selective laser melting, electron beam melting, selective laser sintering (SLS), the multi-jet fusion process (MJF), stereo lithography (SLA), digital light production (DLP), or the fused deposition modelling (FDM) process can be used. The same also applies to the corresponding starting materials such as powder or filaments, which are applied layer by layer in the respective 3D printing processes to produce the desired three-dimensional (3D) object.

In the context of the present invention, the 3D printing process is preferably a sintering process, more preferably a selective laser sintering process (SLS) or a multi-jet fusion process (MJF).

The provision of the structured porous body (PB) via a sintering process preferably comprises the following steps i) and ii):

i) providing a layer of a sinter powder (SP), preferably comprising at least one thermoplastic or thermoset polymer (TP) selected from the group consisting of impact modified vinyl-aromatic copolymers, thermoplastic styrene-based elastomers (S-TPE), polyolefins (PO), aliphatic-aromatic copolyesters, polycarbonates, thermoplastic polyurethanes (TPU), polyamides (PA), polyphenylene sulphides (PPS), polyaryletherketones (PAEK), polysulfones and polyimides (PI), more preferably of thermoplastic styrene-based elastomers (S-TPE), thermoplastic polyurethanes (TPU) and polyamides, and particularly preferably of thermoplastic polyurethanes (TPU), and ii) sintering the layer of the sinter powder (SP) provided in step i).

Following step ii), the layer of the sinter powder (SP) is usually lowered by the layer thickness of the layer of the sinter powder (SP) provided in step i) and a further layer of sinter powder (SP) is applied. This is then sintered again according to step ii).

In this way, on the one hand the upper layer of the sinter powder (SP) bonds with the lower layer of the sinter powder (SP), and on the other hand the particles of the sinter powder (SP) bond with each other within the upper layer by melting.

In the method according to the invention, steps i) and ii) can thus be repeated.

By repeating the lowering of the powder bed, the application of the sinter powder (SP) and the sintering and thus the melting of the sinter powder (SP), the structured porous body (PB) is produced. An additional supporting material is not necessary because the non-melted sinter powder (SP) itself acts as supporting material.

The particularly preferred 3D printing processes, the selective laser sintering process (SLS) or the multi-jet fusion process (MJF), are well known to the person skilled in the art and are described in detail, for example, in U.S. Pat. No. 4,863,538 (SLS), U.S. Pat. No. 5,658,412 (SLS), U.S. Pat. No. 5,647,931 (SLS) and WO 2015/108543 (MJF).

The sinter powder (SP) usually has particles. These particles have, for example, a size (D50 value) in the range of 10 to 190 μm, preferably in the range of 15 to 150 μm, more preferably in the range of 20 to 110 μm and especially preferably in the range of 40 to 100 μm.

In the context of the present invention, "D50" is understood to mean the particle size at which 50% by volume of the particles based on the total volume of the particles are smaller than or equal to D50 and 50% by volume of the particles based on the total volume of the particles are larger than D50.

The sinter powder (SP) usually has a melting temperature $(T_{M(SP)})$ in the range from 80 to 220° C. Preferably, the melting temperature $(T_{M(SP)})$ of the sinter powder (SP) is in the range from 100 to 190° C. and especially preferably in the range of 120 to 170° C.

The melting temperature $(T_{M(SP)})$ is determined within the context of the present invention by means of differential scanning calorimetry (DSC). It is customary to measure a heating run (H) and a cooling run (K), each with a heating rate and cooling rate of 20 K/min respectively, wherein a DSC diagram is obtained. The melting temperature $(T_{M(SP)})$ is then understood to be the temperature at which the melting peak of the heating run (H) of the DSC diagram shows a maximum.

Step b)

In step b), the structured porous body (PB) provided in step a) is inserted into a mould (M), wherein the mould (M) preferably comprises a fixed part (FP) and a moveable part (MP) and the structured porous body (PB) is preferably inserted either into the fixed part (FP) or into the moveable part (MP) of the mould (M).

It is possible that the structured porous body (PB) fits exactly into the mould (M), preferably into the fixed part (FP) or the moveable part (MP) of the mould (M); however it is likewise possible that the structured porous body (PB) fills only part of the mould (M), preferably the fixed part (FP) or the moveable part (MP) of the mould.

In the context of the present invention, the term "fits exactly" means that the length of the structured porous body (PB) corresponds to at least 95%, preferably to at least 98%, to the length of the mould (M), preferably to the length of the fixed part (FP) or the moveable part (MP) of the mould (M), that the width of the structured porous body (PB) corresponds to at least 95%, preferably to at least 98%, to the width of the mould (M), preferably to the width of the fixed part (FP) or the moveable part (MP) of the mould (M), and that the thickness of the structured porous body (PB) corresponds to at least 95%, preferably to at least 98%, to the thickness of the mould (M), preferably to the thickness of the fixed part (FP) or the moveable part (MP) of the mould (M).

In the context of the present invention, the term "fills only part of the mould (M)" means that the length of the structured porous body (PB) corresponds to less than 95% to the length of the mould (M), preferably to the length of the fixed part (FP) or the moveable part (MP) of the mould (M), that the width of the structured porous body (PB) corresponds to less than 95% to the width of the mould (M), preferably to the width of the fixed part (FP) or the moveable part (MP) of the mould (M), and that the thickness of the structured porous body (PB) corresponds to less than 95% to the thickness of the mould (M), preferably to the thickness of the fixed part (FP) or the moveable part (MP) of the mould (M).

Step c)

In step c), the mould (M) is filled with expanded foam beads (EFB) so that the expanded foam beads (EFB) are in contact with each other and the structured porous body (PB) is at least partially in contact with the expanded foam beads (EFB).

In the context of the present invention, the term "at least partially in contact" means that at least 10%, preferably at least 20%, more preferably at least 30%, of the surface of the structured porous body (PB) are in contact with the expanded foam beads (EFB).

Expanded foam beads (EFB) per se are in principle known to the person skilled in the art. Suitable expanded foam beads are, for example, disclosed in WO 94/20568 A1, WO 2007/082838 A1, WO 2017/030835 A1, WO 2013/153190 A1 or WO 2010/010010 A1.

The expanded foam beads (EFB) preferably comprise a thermoplastic elastomer (TPE), polystyrene (EPS), ethylene vinyl acetate (EVA) or polyolefine. Mixtures of the expanded foam beads (EFB) comprising the polymers indicated above can also be used to fill the mould (M). More preferably, the expanded foam beads (EFB) comprise a thermoplastic elastomer (TPE).

Examples of thermoplastic elastomers (TPE) comprised in the expanded foam beads (EFB) are thermoplastic polyurethane, thermoplastic polyamide, thermoplastic polyether ester, thermoplastic (co)polyester, thermoplastic vulcanizate, thermoplastic polyolefine and thermoplastic styrene block copolymer.

Most preferably, the expanded foam beads (EFB) comprise thermoplastic polyurethane. Especially preferred expanded foam beads (EFB) are the expanded foam beads comprising thermoplastic polyurethane, available under the trade name Infinergy® from BASF SE.

Further, the expanded foam beads (EFB) have preferably an average diameter of 0.2 to 20 mm, preferably of 0.5 to 15 mm and in particular of 1 to 12 mm. In case of non-spherical beads, e.g. elongated or cylindrical beads, the average diameter means the average diameter of the longest dimension.

The expanded foam beads (EFB) in the context of the present invention preferably have a melting point $T_{M(EFB)}$ ≤300° C., more preferably ≤250° C. and in particular ≤220° C., determined by means of differential scanning calorimetry (DSC) according to DIN EN ISO 11357-1:2016, whereas the melting point is determined from the DSC curve according to DIN EN ISO 11357-3:2018.

In a preferred embodiment, the expanded foam beads (EFB) have closed cells.

In the context of the present invention, the term "closed cells" means that the cavities of the cells enclosed in the expanded foam beads (EFB) are not connected to each other by openings in the walls of the respective cells. In the context of the present invention, a closed-cell material always comprises more closed cells than open cells (relative to the total number of cells).

Preferably, the expanded foam beads (EFB) having closed cells comprise at least 80%, more preferably at least 90%, most preferably at least 95%, of closed cells, based on the total number of cells in the expanded foam beads (EFB) having closed cells.

In a preferred embodiment, the expanded foam beads (EFB) within the obtained composite article have a bulk density in the range from 20 to 350 kg/m³, preferably in the range from 60 to 210 kg/m³, and more preferably in the range from 100 to 170 kg/m³.

Step d)

In step d), the expanded foam beads (EFB) are thermally welded, wherein the particle foam (PF) is built and the composite article is obtained.

The particle foam (PF), in the context of the present invention, is a foam in which the expanded foam beads (EFB) are bonded.

The thermal welding can be carried out by steam, microwave, variotherm or radio frequency, preferably by steam.

As used herein, the term "by variotherm" means that the thermal welding is carried out under a forced dynamic temperature curve.

Preferably, the thermal welding in step d) is carried out by steaming the expanded foam beads (EFB) at a first temperature $T_1$ which is above the softening temperature $T_S$ of the expanded foam beads (EFB).

The first temperature $T_1$ in step d) is preferably in the range from 90 to 200° C., more preferably in the range from 100 to 170° C., most preferably in the range from 110 to 140° C.

In order to steam the expanded foam beads (EFB), in a preferred embodiment, between step b) and step c), a step e2) is carried out, in which the mould (M) is partially closed by moving the moveable part (MP) of the mould (M) so that a crack (C) is built between the fixed part (FP) and the moveable part (MP), wherein the thickness of the crack (C) is preferably in the range from 5 to 24 mm.

In this case, there is a variable volume through which the density of the foam can be adjusted which means that the expanded foam beads (EFB) are preferably steamed through the crack (C).

In this embodiment, the steaming of the expanded foam beads (EFB) according to step d) preferably comprises the following steps d1) to d4)

d1) steaming the expanded foam beads (EFB) through the crack (C), wherein the steam is supplied on the side of the moveable part (MP) of the mould (M) and exits the mould (M) on the side of the fixed part (FP), or the steam is supplied on the side of the fixed part (FP) of the mould (M) and exits the mould (M) on the side of the moveable part (MP), or the steam is subsequently supplied on the side of the moveable part (MP) and on the side of the fixed part (FP) and exits the mould (M) subsequently on the side of the fixed part (FP) and on the side of the moveable part (MP), respectively, d2) completely closing the mould (M) by further moving the moveable part (MP) of the mould (M), d3) steaming the expanded foam beads (EFB), wherein the steam is supplied on the side of the fixed part (FP) of the mould (M), or steaming the expanded foam beads (EFB), wherein the steam is supplied on the side of the moveable part (MP) of the mould (M), or steaming the expanded foam beads (EFB), wherein the steam is subsequently supplied on the side of the moveable part (MP) and on the side of the fixed part (FP) of the mould (M), and d4) steaming the expanded foam beads (EFB), wherein the steam is simultaneously supplied on the side of the fixed part (FP) and on the side of the moveable part (MP) of the mould (M).

In the context of the present invention, the term "the steam is subsequently supplied on the side of the moveable part (MP) and on the side of the fixed part (FP) and exits the mould (M) subsequently on the side of the fixed part (FP) and on the side of the moveable part (MP), respectively" according to step d1) means either that the steam is first supplied on the side of the fixed part (FP) of the mould (M) and exits the mould (M) on the side of the moveable part (MP) of the mould (M) and after that, the steam is supplied on the side of the moveable part (MP) of the mould (M) and exits the mould (M) on the side of the fixed part (FP) of the mould (M), or the steam is first supplied on the side of the moveable part (MP) of the mould (M) and exits the mould (M) on the side of the fixed part (FP) of the mould (M) and after that, the steam is supplied on the side of the fixed part (FP) of the mould (M) and exits the mould (M) on the side of the moveable part (MP) of the mould (M).

In the context of the present invention, the term "subsequently supplied on the side of the moveable part (MP) and on the side of the fixed part (FP)" according to step d3) means either that the steam is first supplied on the side of the fixed part (FP) of the mould (M) and after that, the steam is supplied on the side of the moveable part (MP) of the mould (M), or the steam is first supplied on the side of the moveable part (MP) of the mould (M) and after that, the steam is supplied on the side of the fixed part (FP) of the mould (M).

The steaming according to step d1) is also called crack steaming. The steaming according to step d3) is also called cross steaming, the steaming according to step d4) is also called autoclave steaming.

In step d1), the expanded foam beads (EFB) are preferably steamed with a steam pressure in the range from 0.7 to 2.0 bar, more preferably with a steam pressure in the range from 1.2 to 1.8 bar on the side of the fixed part (FP) and/or on the side of the moveable part (MP). They are preferably steamed through the crack (C) for a time period in the range from 3 to 30 s, more preferably for a time period in the range from 10 to 20 s.

In step d3), the expanded foam beads (EFB) are preferably steamed with a steam pressure in the range from 1.1 to 3.5 bar, more preferably in the range from 1.1 to 1.5 bar on the side of the fixed part (FP). Further, in step d3), the expanded foam beads (EFB) are preferably steamed with a steam pressure in the range from 1.1 to 3.5 bar, more preferably in the range from 1.5 to 3.0 bar on the side of the moveable part (MP). They are preferably steamed for a time period in the range from 3 to 60 s, more preferably for a time period in the range from 5 to 40 s.

In step d4), the expanded foam beads (EFB) are preferably steamed with an absolute steam pressure in the range from 1.3 to 3.5 bar, more preferably in the range from 1.7 to 3.0 bar. They are preferably steamed for a time period in the range from 3 to 80 s, preferably for a time period in the range from 10 to 60 s.

In order to steam the expanded foam beads (EFB), in a further preferred embodiment, between step b) and step c), a step e1) is carried out, in which the mould (M) is completely closed by moving the moveable part (MP) of the mould (M), wherein the steaming of the expanded foam beads (EFB) according to step d) comprises the following steps d3) and d4)

d3) steaming the expanded foam beads (EFB), wherein the steam is supplied on the side of the fixed part (FP) of the mould (M), or steaming the expanded foam beads (EFB), wherein the steam is supplied on the side of the moveable part (MP) of the mould (M), or steaming the expanded foam beads (EFB), wherein the steam is subsequently supplied on the side of the moveable part (MP) and on the side of the fixed part (FP) of the mould (M), and d4) steaming the expanded foam beads (EFB), wherein the steam is simultaneously supplied on the side of the fixed part (FP) and on the side of the moveable part (MP) of the mould (M).

In this embodiment, the above-mentioned embodiments and preferences with respect to steps d3) and d4) apply analogously. The amount of the expanded foam beads (EFB) is in this case regulated by the filling pressure.

After step d), the mould (M) is preferably cooled with water having a temperature in the range from 10 to 30° C., more preferably 15 to 25° C., preferably for a time period in the range from 1 to 5 minutes.

The present invention also provides a composite article obtained by the above-mentioned process.

The present invention also provides a composite article comprising a structured porous body (PB) and a particle foam (PF). For this composite article, the above-mentioned embodiments and preferences with respect to the composite article obtained by the above mentioned process and the process as such for its production apply analogously. However, the composite article can also be produced by a process, wherein the process comprises the following steps a) to d)

a) providing the structured porous body (PB), b) inserting the structured porous body (PB) provided in step a) into a mould (M), c) filling the mould (M) with expanded foam beads (EFB) so that the expanded foam beads (EFB) are in contact with each other and the structured porous body (PB) is at least partially in contact with the expanded foam beads (EFB), and d) gluing the expanded foam beads (EFB), wherein the particle foam (PF) is built and the composite article is obtained.

However, it is also possible that a hybrid technique is used to build the particle foam, wherein the hybrid technique includes a thermal welding and a gluing.

Preferably, the structured porous body (PB) comprised in the composite article is obtained by a three-dimensional (3D) printing process and the particle foam (PF) comprised in the composite article comprises a thermoplastic elastomer (TPE), polystyrene (PS), ethylene vinyl acetate (EVA), polyolefin or a mixture thereof.

The inventive composite article has a density in the range from 200 to 500 kg/m$^3$, preferably in the range from 250 to 450 kg/m$^3$, and more preferably in the range from 300 to 450 kg/m$^3$.

The inventive composite articles can be used in the shoe industry (for example running shoes, safety shoes), in the sports and leisure sector (for example bike saddles), in vehicle construction (for example furniture, seats), in the medical sector (for example artificial limbs, prostheses), in mechanical engineering and in the logistics sector.

A further subject of the present invention is therefore also the use of the inventive composite articles in the shoe industry, in the sports and leisure sector, in vehicle construction, in the medical sector, in mechanical engineering and in the logistics sector.

Composite Article Comprising a Structured Porous Body (PB) and a Foam (F)

A further subject of the present invention is a composite article comprising a structured porous body (PB) and a foam (F), wherein the structured porous body (PB) and the foam (F) each comprise the same polymer (P). Unless instructed otherwise any terms such as "structured porous body PB" or "foam (F)" have the same meaning (including any preferences) for this subject of the present invention as described for the above mentioned subjects of the present invention.

In a preferred embodiment, the structured porous body (PB) and the foam (F) each comprise at least 50 wt.-% of the polymer (P), preferably at least 70 wt.-% of the polymer (P) and more preferably at least 90 wt.-% of the polymer (P).

In a more preferred embodiment, the structured porous body (PB) and the foam (F) each consist essentially of the same polymer (P).

The term "each consist essentially of" in the present case is understood to mean that the structured porous body (PB) and the foam (F) each comprise more than 98% by weight, preferably more than 99% by weight, more preferably more than 99.5% by weight of the same polymer (P).

In a preferred embodiment, the solvent (S) consists of the same polymer (P).

It is also preferred that the polymer (P) is at least one thermoplastic or thermoset polymer (P) selected from the group consisting of polyolefins, polyamides, polyurethanes, polyacrylates, polymethacrylates, polytetrafluoroethylene and polystyrenes.

It is Also Preferred that the Structured Porous Body (PB)
   i) comprises a three-dimensional network of node points and a void volume, wherein the node points are joined to another by struts and the void volume is present between the struts, and/or
   ii) is produced by a three-dimensional (3D) printing process, and/or
   iii) is a lattice or a triply periodic minimal surface (TPMS).

It is also preferred that the 3D printing process is a sintering process, preferably a selective laser sintering process (SLS) or a multi-jet-fusion process (MJF).

The invention is explained in more detail below by examples, but is not restricted thereto.

EXAMPLES

Inventive Examples E1 and E2

Production of Composite Articles

Step a) (Provision of the Structured Porous Bodies (PB))

Two lattices, designed in Rhino/Grasshopper, were generated. Therefore, a space of 200×200×20 mm was filled with a graph of diamond structure and different diameters were applied, e.g. for diamond-lattice (D 1 mm), a 1 mm diameter was applied to the graph. After exporting this structure, it was 3D-printed using an HP 5200 MJF printer and a thermoplastic polyurethane powder (Ultrasint® TPU01, BASF SE). After printing, the lattices were cleaned by dry air and sandblasting.

The generated lattices are listed in table 1.

TABLE 1

| Lattice | Type |
| --- | --- |
| Lat 1 | diamond-lattice (D 1 mm) |
| Lat 2 | gradient-lattice (D 0.7-2 mm) |

Step b) (Insertion of the Structured Porous Body (PB))

For the production of the composite articles, a steam chest moulder, type Boost Energy Foamer K68 from company Kurtz Ersa GmbH, was used. The machine was equipped with a quadratic test plate mould (M) (dimension: 200×200× 20 mm) which was made up of a fixed part (FP) and a movable part (MP). The 3D printed lattices were each inserted into the fixed part (FP) of the mould (M).

Step e2) (Partially Closing of the Mould (M))

After inserting the respective lattice into the fixed part (FP) of the mould (M), the mould (M) was partially closed by moving the moveable part (MP) of the mould (M) so that a crack (C) is built between the fixed part (FP) and the moveable part (MP) of the mould (M).

Step c) (Filling of the Mould (M))

Then, the mould (M) was filled with expanded foam beads (EFB) (expanded thermoplastic polyurethane foam beads Infinergy 200 MP, BASF SE) so that the expanded foam beads (EFB) are in contact with each other and the lattice is at least partially in contact with the expanded foam beads (EFB).

Step d1) (Crack Steaming)

After filling the mould (M) with the expanded foam beads (EFB), the expanded foam beads (EFB) were steamed through the crack (C), wherein the steam is supplied on the side of the moveable part (MP) of the mould (M) and exits the mould (M) on the side of the fixed part (FP).

Step d2)

Then, the mould (M) was completely closed by further moving the moveable part (MP) of the mould (M).

Step d3) (Cross Steaming)

After completely closing the mould (M), the expanded foam beads (EFB) were steamed, wherein the steam is supplied on the side of the fixed part (FP) of the mould (M).

Step d4) (Autoclave Steaming)

After the cross steaming, the expanded foam beads (EFB) were steamed again, wherein the steam is simultaneously supplied on the side of the fixed part (FP) and on the side of the moveable part (MP) of the mould (M).

Comparative Examples C1, C2 and C3

As reference, pure particle foam (PF) articles were also produced by a process comprising steps e2), c), d1), d2), d3) and d4), which means that no structured porous body (PB) was inserted into the mould (M).

In table 2, the composition of the different (composite) articles, the thickness of the crack (C), the crack steam pressure, the crack steaming time period, the cross steam pressure, the cross steam time period, the autoclave steam pressure and the autoclave steam time period are given.

TABLE 2

| Example | E1/E4 (Lat 1 + expanded thermoplastic PU foam beads) | E2 (Lat 2 + expanded thermoplastic PU foam beads) | E3 (Lat 2 + expanded thermoplastic PU foam beads) | E5 (Lat 1 + expanded thermoplastic PU foam beads) | C1 (Expanded thermoplastic PU foam beads) | C2 (Expanded thermoplastic PU foam beads) | C3 (Expanded thermoplastic PU foam beads) | C4 (Expanded thermoplastic PU foam beads) | C5 (Expanded thermoplastic PU foam beads) |
|---|---|---|---|---|---|---|---|---|---|
| Thickness of the crack (C) [mm] | 15 | 20 | 10 | 20 | 15 | 22 | 24 | 10 | 5 |
| Crack steam pressure [bar] | 0.6 | 0.6 | 0.6 | 0.6 | 0.6 | 0.6 | 0.6 | 0.6 | 0.6 |
| Crack steaming time period [s] | 16 | 16 | 16 | 16 | 16 | 16 | 16 | 16 | 16 |
| Cross steam pressure [bar] | 1.3 | 1.3 | 1.3 | 1.3 | 1.3 | 1.3 | 1.3 | 1.3 | 1.3 |
| Cross steaming time period [s] | 30 | 30 | 30 | 30 | 30 | 30 | 30 | 30 | 30 |
| Autoclave steam pressure (fixed part/moveable part) [bar] | 1.3/1.8 | 1.3/1.8 | 1.3/1.8 | 1.3/1.8 | 1.3/1.8 | 1.3/1.8 | 1.3/1.8 | 1.3/1.8 | 1.3/1.8 |
| Autoclave steaming time period [s] | 10 | 10 | 10 | 10 | 10 | 10 | 10 | 10 | 10 |
| Cooling time period (fixed part/moveable part) [s] | 120/120 | 120/120 | 120/120 | 120/120 | 120/120 | 120/120 | 120/120 | 120/120 | 120/120 |

The cooling water has a temperature of 17 to 23° C.

Characterization of the (Composite) Articles

Before testing, the (composite) articles were stored for at least 16 hours under standardized climate conditions (23±2° C. and 50±5% humidity). The testing was also carried out under standardized climate conditions.

Density and Density Distribution Δ

Six specimens with the dimension 50×50 mm were sawn out of the (composite) article with a band saw. The specimens were taken from the positions shown in FIG. 1. The (composite) article is shown from the point of view as it would be still inside the fixed part (FP) of the mould (M).

For each specimen, density was calculated by determining its mass (precision scale; accuracy: ±0.001 g) and dimensions (length, thickness and width, calliper; accuracy: ±0.01 mm, contact pressure 100 Pa, value was only measured once in the middle of the specimen). The density distribution Δ of all specimens was calculated using the standard deviation σ and the mean $\bar{x}$ (equations 1-3).

$$\bar{x} = \frac{1}{n}\sum x \tag{1}$$

$$\sigma = \sqrt{\frac{\sum(x - \bar{x})^2}{(n-1)}} \tag{2}$$

$$\Delta = \frac{\sigma}{\bar{x}} \cdot 100\%, \tag{3}$$

where n is the number of specimens (n=6) and x is the calculated density of the individual specimen.

Compression Hardness

For determination of the compression behaviour of the (composite) articles, specimens with the dimensions 50×50 mm×original thickness of the plate (in general 20 mm, but thickness can vary slightly due to shrinkage, skin is not removed) were taken from the (composite) articles by a band saw. Specimens were taken from the same positions presented in FIG. 1.

For each specimen, the mass (precision scale; accuracy: ±0.001 g), as well as the length and width (calliper; accuracy: ±0.01 mm, contact pressure 100 Pa, value was only measured once in the middle of the specimen) was measured.

Compression behaviour was then measured with a 50 kN force transducer (class 1 according to DIN EN ISO 7500-1:2018-06), a crosshead travel encoder (class 1 according to DIN EN ISO 9513:2013) and two parallel pressure plates (diameter 2000 mm, maximum permissible force 250 kN, maximum permissible surface pressure 300 N/mm$^2$) without holes. For determining the density of the specimen, the measured mass, length and width were entered into the test specifications of the software of the test machine from company Zwick. The thickness of the specimen was determined by the universal test machine via the traverse path measuring system (accuracy: ±0.25 mm).

The measurement itself was carried out with a test speed of 50 mm/min and a pre-force of 1 N. The force in kPa was recorded at a stint of 10, 25, 50 and 75%. The values of the 1st cycle were used for evaluation. In order to evaluate the compression hardness at 75%, the sample must be compressed to 76%.

The results of the test are summarized in table 3.

Hydraulic Impact Test (HIT)

Compression behaviour under dynamic conditions was measured from the whole (composite) articles (dimension 200×200 mm×original thickness of the plate (in general 20 mm, but thickness can vary slightly due to shrinkage, skin is not removed) by using the HIT procedure according to Bruckner et al., Polyurethane-foam midsoles in running shoes—Impact energy and damping, Procedia engineering, 2 for short-term testing (100 load cycles).

The measurement was carried out using a servo-hydraulic tensile-compression test machine. The test set-up consists of a crowned punch, which is aligned at an angle of 90° to the fixed base of the (composite) article to be tested. The load spectrum is derived from measurements of the ground reaction force occurring during walking. The analysis of the resulting curve shows that the rear foot area of a runner is loaded with about twice the body weight when hitting the ground at a running speed of 3.5±0.1 m/s. A force-time curve is plotted in the testing machine according to these results. This reflects the first force peak (ground contact of the rear foot) of the biomechanical loads occurring for an average runner. The mechanical running shoe tests are based on the higher reliability and the significantly lower expenditure of time compared to test person tests. The aim of this mechanical test is limited to the realistic reproduction of the vertical force component during the contact of the rear foot with the ground.

Figure 2:
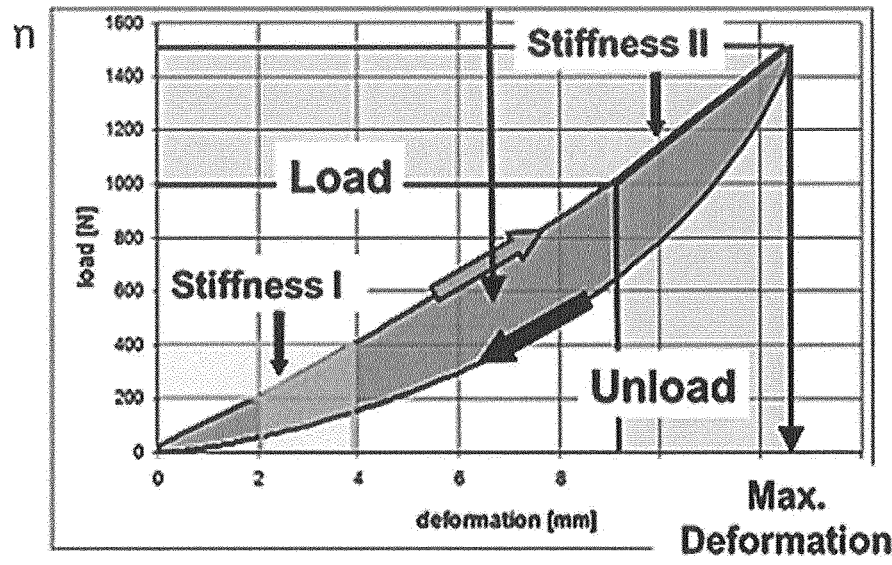
FIG. 2 is a graph of four parameters of interest in the evaluation of the composite articles.
Figure 3:
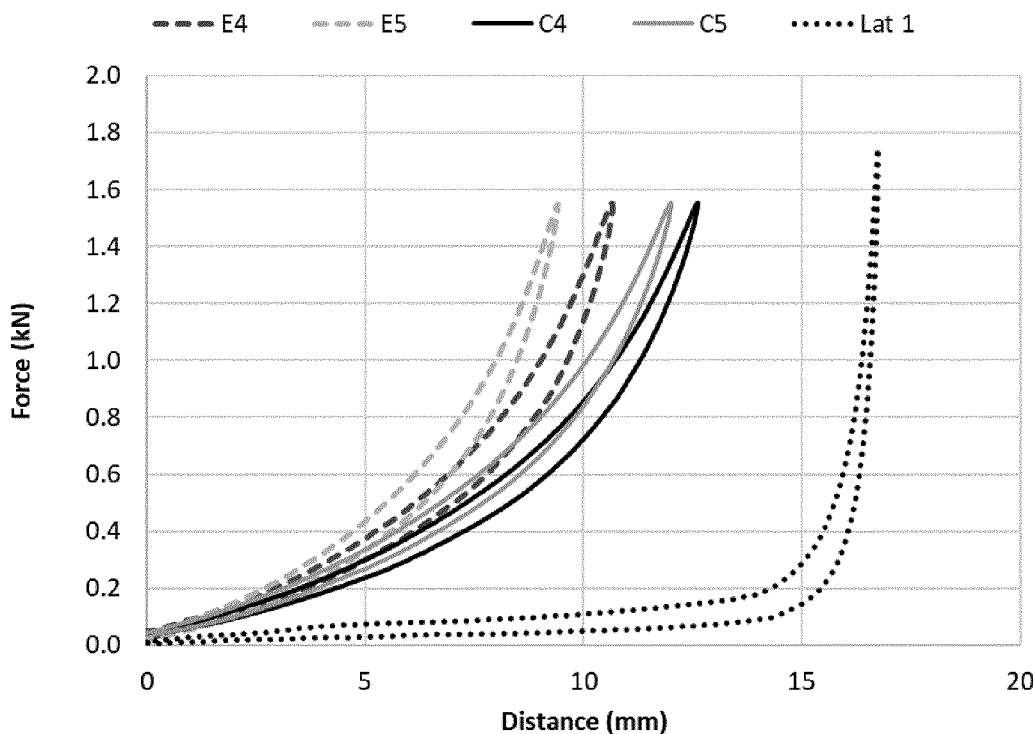
FIG. 3 provides the force and deformation curve for a compression test of the composite articles.

The short-term test is performed over 100 load cycles. The result is the force and deformation curve of the 100th cycle (recorded at a frequency of 100 Hz) and is shown in FIG. 3. For running shoes, four parameters are of interest in the evaluation which are described below and shown in FIG. 2:

Stiffness I: represents a parameter for the perceived hardness of a running shoe when stationary. This is determined for running shoes between 200-400 N—based on 0.5 times the mass of an average runner of 75 kg.

Stiffness II: is a parameter for the perceived hardness of the running shoe in the landing phase of a step. This is determined for running shoes between 1,000-1,500 N.

Energy loss: the proportion of the energy introduced that is absorbed by the material and dissipated as heat. The energy loss is calculated from the difference in the areas under the force-deformation curve of the loading and unloading phases (hysteresis curve).

Max. Deformation: maximum punch penetration depth

Although the method was developed specifically for running shoes, it can also be used for the initial characterisation of new materials based on test plates such as the (composite) articles. For shoe applications in general, all running shoe specific parameters are of interest. But also for other applications where the material is used as a damping or vibration decoupling element, the test is especially interesting to investigate the energy loss.

The results of the test are summarized in table 4.

TABLE 3

| Example | E1 (Lat 1 + expanded thermoplastic PU foam beads) | E2 (Lat 2 + expanded thermoplastic PU foam beads) | E3 (Lat 2 + expanded thermoplastic PU foam beads) | C1 (Expanded thermoplastic PU foam beads) | C2 (Expanded thermoplastic PU foam beads) | C3 (Expanded thermoplastic PU foam beads) |
|---|---|---|---|---|---|---|
| Density (Position 1) [g/L] | 330 | 330 | — | 324 | — | — |
| Density (Position 2) [g/L] | 334 | 350 | — | 322 | — | — |
| Density (Position 3) [g/L] | 335 | 373 | — | 330 | — | — |
| Density (Position 4) [g/L] | 340 | 329 | — | 331 | — | — |
| Density (Position 5) [g/L] | 331 | 409 | — | 332 | — | — |
| Density (Position 6) [g/L] | 329 | 361 | — | 320 | — | — |
| Density distribution [%] | 1.2 | 8.4 | — | 1.6 | — | — |
| Compression hardness at 50% compression (Position 1) [kPa] | 492 | 462 | — | — | — | — |
| Compression hardness at 50% compression (Position 2) [kPa] | 507 | 539 | — | — | — | — |
| Compression hardness at 50% compression (Position 3) [kPa] | 513 | 672 | — | — | — | — |

TABLE 3-continued

| Example | E1 (Lat 1 + expanded thermo-plastic PU foam beads) | E2 (Lat 2 + expanded thermo-plastic PU foam beads) | E3 (Lat 2 + expanded thermo-plastic PU foam beads) | C1 (Expanded thermo-plastic PU foam beads) | C2 (Expanded thermo-plastic PU foam beads) | C3 (Expanded thermo-plastic PU foam beads) |
|---|---|---|---|---|---|---|
| Compression hardness at 50% compression (Position 4) [kPa] | 534 | 771 | — | — | — | — |
| Compression hardness at 50% compression (Position 5) [kPa] | 508 | 948 | — | — | — | — |
| Compression hardness at 50% compression (Position 6) [kPa] | 495 | 621 | — | — | — | — |
| Compression hardness at 75% compression (Position 1) [kPa] | 6021 | 5073 | — | — | — | — |
| Compression hardness at 75% compression (Position 2) [kPa] | 6399 | 6976 | — | — | — | — |
| Compression hardness at 75% compression (Position 3) [kPa] | 6536 | 9938 | — | — | — | — |
| Compression hardness at 75% compression (Position 4) [kPa] | 6996 | 12268 | — | — | — | — |
| Compression hardness at 75% compression (Position 5) [kPa] | 6353 | 14584 | — | — | — | — |
| Compression hardness at 75% compression (Position 6) [kPa] | 6047 | 8775 | — | — | — | — |

As can be seen from table 3, by using a lattice with a gradient in diameter a stiffness gradient can be achieved. By this, compression hardness at 50% compression of the stiffest specimen can be 105% higher than the value of the softest specimen tested for one plate, wherein the density of the stiffest specimen is only 24% higher compared to the softest. For a compression of 75% the effect is even bigger as the highest compression hardness is increased by 187% compared to the lowest.

TABLE 4

| | Example | | | | |
|---|---|---|---|---|---|
| | E4 (Lat 1 + expanded thermo-plastic PU foam beads) | E5 (Lat 1 + expanded thermo-plastic PU foam beads) | C4 (Expanded thermo-plastic PU foam beads) | C5 (Expanded thermo-plastic PU foam beads) | Lat 1 |
| Density [g/L] | 319 | 350 | 306 | 317 | 50 |
| Stiffness 1 [kN/mm] | 0.09 | 0.10 | 0.08 | 0.07 | 0.17 |
| Stiffness 2 [kN/mm] | 0.36 | 0.39 | 0.29 | 0.29 | 1.87 |
| Energy loss [J] | 0.8 | 0.9 | 1.0 | 1.0 | 1.2 |
| Dampening [%] | 17.4 | 19.0 | 16.4 | 16.1 | 48.0 |

In this measurement, the pure insert shows the behaviour of a very flexible foam, i.e. the material shows an high compression even at low forces and at even higher compression a sudden increases in stiffness. Thus the lattice (Lat 1) already shows a high "stiffness I" and a much higher "stiffness II" compared to the E-TPU (C4 and C5). The combination of E-TPU and lattice, however, shows a similar force deflection curve as the pure E-TPU, whereby the "stiffness I" hardly changes compared to the E-TPU, i.e. one would have the same feeling when putting on a shoe. However, a higher "stiffness II" can be achieved with the same density. Too soft (stiffness II) E-TPU soles are perceived by many as unstable when walking. So one could achieve a higher stability without making the shoe heavier. In addition, energy loss and damping are almost not changed by the insertion of the grid, although the grid alone has very high damping values, for example.

The invention claimed is:

1. A process for the production of a composite article comprising a structured porous body (PB) and a particle foam (PF), wherein the process comprises the following steps a) to d)

a) providing the structured porous body (PB), b) inserting the structured porous body (PB) provided in step a) into a mould (M), c) filling the mould (M) with expanded foam beads (EFB) so that the expanded foam beads (EFB) are in contact with each other, and the structured porous body (PB) is at least partially in contact with the expanded foam beads (EFB), and d) thermally welding the expanded foam beads (EFB), wherein the particle foam (PF) is built and the composite article is obtained, wherein the expanded foam beads (EFB) and the structured porous body (PB) consist of the same polymer, wherein the polymer comprises a thermoplastic polyurethan, and wherein the structured porous body (PB)

i) comprises a three-dimensional network of node points and a void volume, wherein the node points are joined to another by struts and the void volume is present between the struts, and ii) is produced by a three-dimensional (3D) printing process, wherein the 3D printing process is a sintering process, and iii) is a lattice or a triply periodic minimal surface (TPMS), and iv) fits exactly into the mould (M), or fills only part of the mould (M).

2. The process according to claim 1, wherein the sintering process comprises the following steps i) and ii)

i) providing a layer of a sinter powder (SP), and ii) sintering the layer of the sinter powder (SP) provided in step i).

3. The process according to claim 1, wherein the expanded foam beads (EFB) are thermally welded by steam, microwave, variotherm or radio frequency.

4. The process according to claim 1, wherein the mould (M) comprises a fixed part (FP) and a moveable part (MP), and, in step b), the structured porous body (PB) is inserted either into the fixed part (FP) or into the moveable part (MP) of the mould (M).

5. The process according to claim 1, wherein the thermal welding in step d) is carried out by steaming the expanded foam beads (EFB) at a first temperature $T_1$ which is above the softening temperature $T_s$ of the expanded foam beads (EFB).

6. The process according to claim 5, wherein the first temperature $T_1$ in step d) is in the range from 90 to 200° C.

7. The process according to claim 1, wherein, between step b) and step c), a step e2) is carried out, in which the mould (M) is partially closed by moving the moveable part (MP) of the mould (M) so that a crack (C) is built between the fixed part (FP) and the moveable part (MP), wherein the thickness of the crack (C) is in the range from 5 to 24 mm.

8. The process according to claim 7, wherein the steaming of the expanded foam beads (EFB) according to step d) comprises the following steps d1) to d4)

d1) steaming the expanded foam beads (EFB) through the crack (C), wherein the steam is supplied on the side of the moveable part (MP) of the mould (M) and exits the mould (M) on the side of the fixed part (FP), or the steam is supplied on the side of the fixed part (FP) of the mould (M) and exits the mould (M) on the side of the moveable part (MP), or the steam is subsequently supplied on the side of the moveable part (MP) and on the side of the fixed part (FP) and exits the mould (M) subsequently on the side of the fixed part (FP) and on the side of the moveable part (MP), respectively, d2) completely closing the mould (M) by further moving the moveable part (MP) of the mould (M), d3) steaming the expanded foam beads (EFB), wherein the steam is supplied on the side of the fixed part (FP) of the mould (M), or steaming the expanded foam beads (EFB), wherein the steam is supplied on the side of the moveable part (MP) of the mould (M), or steaming the expanded foam beads (EFB), wherein the steam is subsequently supplied on the side of the moveable part (MP) and on the side of the fixed part (FP) of the mould (M), and d4) steaming the expanded foam beads (EFB), wherein the steam is simultaneously supplied on the side of the fixed part (FP) and on the side of the moveable part (MP) of the mould (M).

9. The process according to claim 8, wherein i) in step d1), the expanded foam beads (EFB) are steamed with a steam pressure in the range from 0.7 to 2.0 bar, on the side of the fixed part (FP) and/or on the side of the moveable part (MP), and/or ii) in step d1), the expanded foam beads (EFB) are steamed for a time period in the range from 3 to 30 s, and/or iii) in step d3), the expanded foam beads (EFB) are steamed with a steam pressure in the range from 1.1 to 3.5 bar, on the side of the fixed part (FP), and/or iv) in step d3), the expanded foam beads (EFB) are steamed with a steam pressure in the range from 1.1 to 3.5 bar, on the side of the moveable part (MP), and/or v) in step d3), the expanded foam beads (EFB) are steamed for a time period in the range from 3 to 60 s, and/or vi) in step d4), the expanded foam beads (EFB) are steamed with an absolute steam pressure in the range from 1.3 to 3.5 bar, and/or vii) in step d4), the expanded foam beads (EFB) are steamed for a time period in the range from 3 to 80 s.

10. The process according to claim 1, wherein, between step b) and step c), a step e1) is carried out, in which the mould (M) is completely closed by moving the moveable part (MP) of the mould (M), wherein the steaming of the expanded foam beads (EFB) according to step d) comprises the following steps d3) and d4)

d3) steaming the expanded foam beads (EFB), wherein the steam is supplied on the side of the fixed part (FP) of the mould (M), or steaming the expanded foam beads (EFB), wherein the steam is supplied on the side of the moveable part (MP) of the mould (M), or steaming the expanded foam beads (EFB), wherein the steam is subsequently supplied on the side of the moveable part (MP) and on the side of the fixed part (FP) of the mould (M), and d4) steaming the expanded foam beads (EFB), wherein the steam is simultaneously supplied on the side of the fixed part (FP) and on the side of the moveable part (MP) of the mould (M).

11. A composite article obtained by a process according to claim 1.

* * * * *